UNITED STATES PATENT OFFICE.

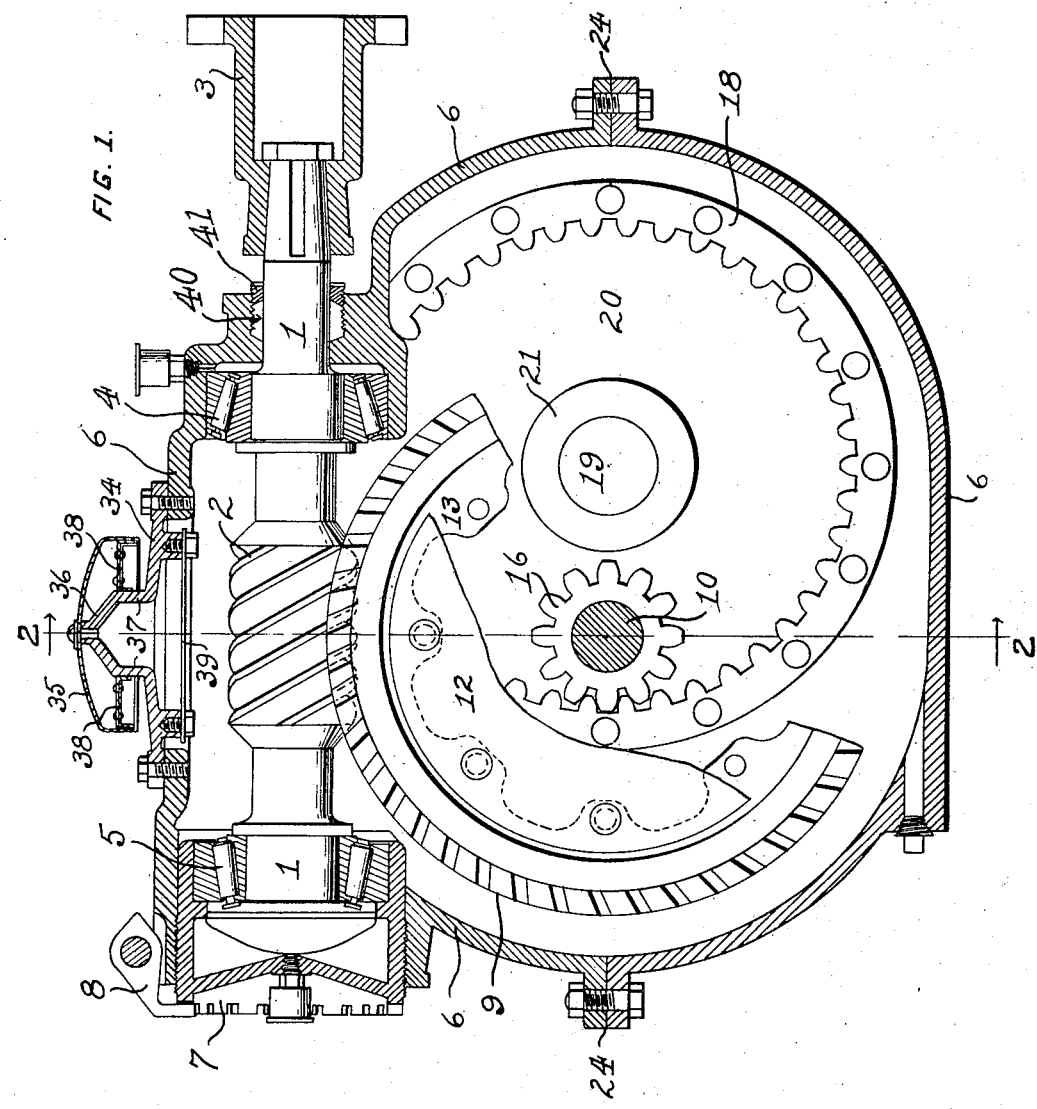

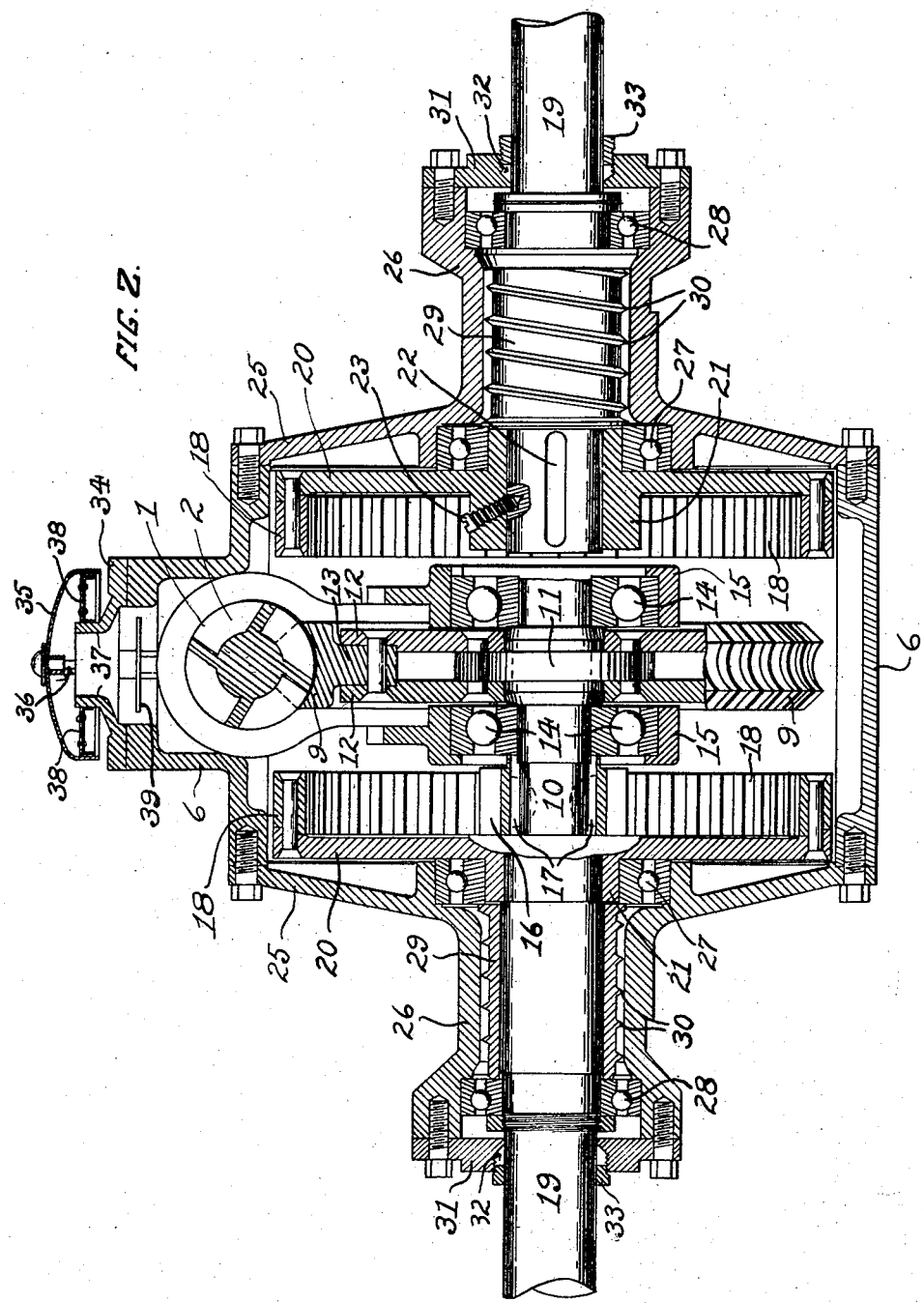

FRANK MOON, OF OAKLAND, CALIFORNIA, ASSIGNOR TO MOON TRACTOR CO., OF SAN FRANCISCO, CALIFORNIA, A CORPORATION OF CALIFORNIA.

TRANSMISSION MECHANISM FOR TRACTORS.

1,351,485.   Specification of Letters Patent.   Patented Aug. 31, 1920.

Application filed October 29, 1919. Serial No. 334,304.

*To all whom it may concern:*

Be it known that I, FRANK MOON, a citizen of the United States, residing at Oakland, in the county of Alameda and State of California, have invented certain new and useful Improvements in Transmission Mechanisms for Tractors, of which the following is a specification.

My invention relates to a speed-reducing power-transmitting mechanism for tractors, and is particularly adaptable to tractors of the endless track-laying type, although it may also be used in the construction of other types of tractors or other classes of machinery.

The object of my invention is to provide a simple, strong, and mechanically efficient mechanism in which the power is transmitted through speed-reducing gearing, the driven shaft being perpendicular to the driving shaft. When used in a tractor, the driven shaft may conveniently be utilized as the main driving axle of the vehicle, the driving shaft lying longitudinally of the frame of the vehicle and being coupled in any desired manner with a suitable source of motive power.

In order to obtain a sufficient reduction in speed between driving and driven shafts, and still have relatively high mechanical efficiency, I employ a double-reduction principle, the first reduction being obtained through a multiplex, and preferably quadruplex threaded worm and worm-wheel of comparatively steep pitch, thus keeping friction losses at a minimum, and the second through spur gears, the worm-wheel shaft carrying a pair of pinions which mesh with internal gears mounted upon the driven shafts. The entire mechanism is inclosed for the exclusion of dust and the retention of lubricant, in a tight housing which may be easily mounted upon the vehicle frame.

My transmission mechanism does not function as a balance gear between oppositely disposed driving wheels, for, although a divided driven shaft is used, one-half thereof extending to each side, both halves of said shaft are positively driven in unison at all times.

With these points in view, I will now more fully describe my invention with reference to the accompanying sheets of drawings, wherein, Figure 1 is a broken longitudinal section of my transmission mechanism.

Fig. 2 is a broken transverse section of the same, taken mainly on the line 2—2 of Fig. 1, and viewed in the direction of the arrows.

Referring more particularly to the drawings, the reference numeral 1 designates a driving shaft, upon which is mounted a worm 2 having a quadruple thread, and a suitable coupling member 3, Fig. 1, adapted for connection with any appropriate source of motive power, not shown. The driving shaft 1 is supported in bearings 4 and 5, here shown as roller bearings, capable of taking both radial and end thrust, the forward bearing 4 being mounted directly in the housing 6, and the rear bearing 5 in an adjustable cap 7 screwed into said housing 6 and locked in the usual manner by a removable key 8.

The worm 2 meshes with a worm wheel 9, Figs. 1 and 2 mounted upon a short transverse shaft 10. In the preferred construction, as illustrated in Fig. 2, the shaft 10 is formed with an integral central flange 11, to which are secured, as by riveting, a pair of disks 12. The worm wheel 9 is formed with a central web 13 projecting inwardly from its rim, and said web lies between, and is secured to the disks 12, preferably by means of rivets.

The worm wheel shaft 10 is mounted in bearings 14, shown as ball bearings of the usual type, and carried in brackets 15 extending inwardly from the housing 6. The ends of said shaft 10 project beyond said bearings 14, and carry spur gear pinions, one of which is shown at 16 in Figs. 1 and 2, secured preferably by keys 17, Fig. 2. Said pinions mesh with internal gears 18, which are fixed to and drive the transverse driven shaft 19. In practice I prefer to rivet said internal gears to disks 20 which are formed integrally with their hubs 21, and said hubs are secured upon the inner ends of the driven shafts 19 by means of keys 22 and set screws 23, but it is to be understood that any suitable construction may be employed.

The housing 6 is divided horizontally, as shown at 24, Fig. 1 for the sake of accessibility, and is completed by bolted-on end plates 25, Fig. 2, formed with tubular extensions 26 in which are mounted bearings, preferably of the ball type, which carry the driven shafts 19. The inner bearings 27 are preferably mounted on the hubs 21 of the internal gears 18, and the outer bearings 28 directly on the driven shafts 19. Spacer sleeves 29 are mounted on said driven shafts between the bearings 27 and 28, and said spacer sleeves are formed with spiral threads 30 upon their outer surfaces, the threads of one sleeve being right-hand and those of the other left-hand, for the purpose of preventing oil from working out along the driven shafts when said shafts are revolving in their normal forward direction. As a further precaution against the escape of oil, I provide the ends of the tubular housing extensions 26 with removable caps 31 in which are provided suitable packing glands 32 and nuts 33. The housing 6 is also provided with a packing gland 40 and nut 41, Fig. 1 surrounding the driving shaft 1, to prevent escape of lubricant at this point.

The upper portion of the housing 6 is provided with a hand hole having a removable cover 34, Figs. 1 and 2 and in said cover is a breather comprising a bell-shaped cap 35 supported by a yoke 36 extending across the top of a tubular extension 37, and an annular screen 38 fixed to the rim of said cap and occupying the space between said rim and the exterior of said tubular extension 37. A baffle 39 is provided on the under side of the cover 34 beneath said tubular extension. Said breather enables the free escape of air to equalize the pressure within the housing when the mechanism becomes warmed by the friction of normal operation or otherwise and thereby to prevent the lubricant from being forced out along the shafts, and taken in conjunction with the packing on the driving shaft 1 and the driven shafts 19, and the spirally threaded sleeves 29, provides a practically oil-tight housing.

I claim:

1. A transmission mechanism comprising a substantially cylindrical open-ended housing; a driving shaft positioned therein at right-angles to the axis of said housing; a worm mounted upon said driving shaft; a counter-shaft within said housing and positioned parallel with the axis thereof; a worm-wheel fixed upon said counter-shaft and adapted to mesh with said worm; a pinion fixed upon each end of said counter-shaft; an internal gear driven by each pinion; a driven shaft fixed to and extending outwardly from each internal gear; and a pair of end plates removably secured to said housing, said plates having tubular extensions for surrounding and supporting said driven shafts.

2. A transmission mechanism comprising an inclosed housing adapted to contain a supply of lubricant, said housing having a substantially cylindrical open ended central section formed with a vent aperture in its upper portion, and a pair of end plates removably secured to said central section, said end plates having alined laterally projecting tubular extensions; a driving shaft journaled within the central section of said housing at right angles to the axis thereof; a worm mounted upon said driving shaft; a counter-shaft journaled within said central housing section parallel with the axis thereof; a worm-wheel fixed upon said counter-shaft and adapted to be driven by said worm; a pinion fixed upon each end of said counter-shaft; an internal gear driven by each pinion; a driven shaft fixed to each internal gear, said driven shafts extending through and being rotatably supported by the tubular extensions of the housing end plates; and packing means surrounding said driven shafts at the ends of said tubular housing extensions to prevent the egress of lubricant therefrom.

In testimony whereof I have signed my name to this specification in the presence of two subscribing witnesses.

FRANK MOON.

Witnesses:
 WILLIAM F. BOOTH, Jr.,
 D. B. RICHARDS.